(12) United States Patent
Kikuchi

(10) Patent No.: US 8,601,026 B2
(45) Date of Patent: Dec. 3, 2013

(54) DATA MANAGEMENT DEVICE, DATA MANAGEMENT SYSTEM AND DATA MANAGEMENT METHOD

(75) Inventor: Toru Kikuchi, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 757 days.

(21) Appl. No.: 11/564,762

(22) Filed: Nov. 29, 2006

(65) Prior Publication Data

US 2007/0130198 A1 Jun. 7, 2007

(30) Foreign Application Priority Data

Dec. 7, 2005 (JP) .................................. 2005-353987

(51) Int. Cl.
*G06F 17/30* (2006.01)
(52) U.S. Cl.
USPC ............................ 707/781; 707/783; 707/785
(58) Field of Classification Search
USPC ...................................... 707/9, 781, 783, 785
See application file for complete search history.

(56) References Cited

U.S. PATENT DOCUMENTS

| 6,931,419 | B1 * | 8/2005 | Lindquist ...................... 707/200 |
| 7,716,140 | B1 * | 5/2010 | Nielsen et al. ................ 705/319 |
| 2004/0199582 | A1 * | 10/2004 | Kucharewski et al. ....... 709/204 |
| 2005/0198031 | A1 * | 9/2005 | Pezaris et al. ..................... 707/9 |
| 2005/0235062 | A1 * | 10/2005 | Lunt et al. ..................... 709/225 |
| 2006/0194186 | A1 * | 8/2006 | Nanda ........................... 434/350 |
| 2007/0005694 | A1 * | 1/2007 | Popkin et al. ................. 709/204 |

FOREIGN PATENT DOCUMENTS

JP 2001-229282 A 8/2001

* cited by examiner

*Primary Examiner* — Mahesh Dwivedi
(74) *Attorney, Agent, or Firm* — Canon USA Inc. IP Division

(57) ABSTRACT

Contents can be opened to a suitable group by a simple operation. A data management method allows a plurality of users to browse stored data. The method includes setting association of first data which is previously set to be opened and at least one second data. Third groups to which these second data is opened are determined based on first groups of the first data set to be opened and second groups to which a user setting the association belongs. Then, the second data are opened to a user who belongs to the third groups.

8 Claims, 17 Drawing Sheets

DATA MANAGEMENT DEVICE, DATA MANAGEMENT SYSTEM AND DATA MANAGEMENT METHOD

BACKGROUND OF THE INVENTION

1. Field of the Invention

The present invention relates to a data management device, data management system and, method for managing data by which a plurality of users can browse stored data.

2. Description of the Related Art

In recent years, a personal computer, a digital still camera, a digital video camera, and a portable digital audio player have come into widespread use. Accordingly, many kinds of contents such as a document, still image, moving image and music have been digitized. These contents are stored and utilized in a mass-storage medium, e.g., a hard disk drive. Among these contents, photographs and videos shot by individuals can be transmitted to a family and a friend by attaching them to an electronic mail message. The photographs and videos are also put on a home page and immediately exchanged using the Internet. This has changed communication to be more diverse.

To exchange small-volume data in such communication, the electronic mail message is often used. In the case of large-volume data, the home page is often used. This is because in the case of an electronic mail system, a transmit and receive size of data is limited.

Under such circumstances, in order to create a home page which can open contents to the public, a certain extent of knowledge and time are required. Hence, various services have been proposed which can easily open contents on the Internet. A user utilizes such service to open his photographs and videos to a family and a friend and can have a chat about the opened contents by writing on a home page and transmitting electronic mail. Further, in such a process, new photographs and videos are further introduced to each other to expand a topic of conversation, and further communication is developed.

In many cases, a user belongs to various groups such as a family, colleagues in a company, friends in school days, and fiends having a common interest. Thus, there has been a growing need to designate a plurality of these groups to which his contents are opened.

Conventionally, when contents are opened to the designated groups, a community ID and a password are prescribed for every group. At the time of access, the community ID and the password are input (refer to Japanese Patent Application Laid-Open No. 2001-229282).

Further, when contents are opened, an opening destination group is selected from a list of groups in order to carry out opening setting.

However, in the above-described conventional example, when new contents are opened in relation to certain contents opened to a plurality of groups, the new contents are opened only to the groups corresponding to a community ID that is input at the time of access. Hence, access is individually carried out by each community ID to confirm whether contents serving an association destination are present. Then, the opening of desired contents has to be set, which is a complicated operation.

Further, once the contents serving the association destination are opened to all relevant groups, there is a possibility that the contents are browsed by a user in a group unrelated to its own destination. Furthermore, if contents are opened to all groups that it belongs to, there is inconvenience that the contents are unexpectedly opened to groups unrelated to the contents that serve the association destination. Hence, opening destination groups to which the contents are served, have to be first examined. Then, a suitable group is selected from these opening destination groups to set new opening destination groups, which is a complicated operation.

SUMMARY OF THE INVENTION

Embodiments of the present invention are provided to solve or at least mitigate the above-described problem and are directed to opening contents to a suitable group with a simple operation.

Embodiments of the present invention are directed to a data management device, system and, method.

According to an aspect of the present invention, at least one embodiment is directed to a data management device capable of storing data, managing a plurality of users as a group and opening the data to a user who belongs to a designated group. The data management devices includes an association setting unit configured to set association of first data which is previously set to be opened, and at least one second data; a determination unit configured to determine third groups which open the second data, based on first groups of the first data and second groups to which a user setting the association belongs; and an opening unit configured to open the second data to a user who belongs to the third groups.

According to another aspect of the present invention, at least one embodiment is directed to a data management method for allowing a plurality of users to browse stored data. The method includes setting association of first data which is previously set to be opened, and at least one second data; determining third groups which open the second data, based on first groups of the first data set to be opened, and second groups to which a user setting the association belongs; and opening the second data to a user who belongs to the third groups.

According to an embodiment of the present invention, contents can be opened to a suitable group with a simple operation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
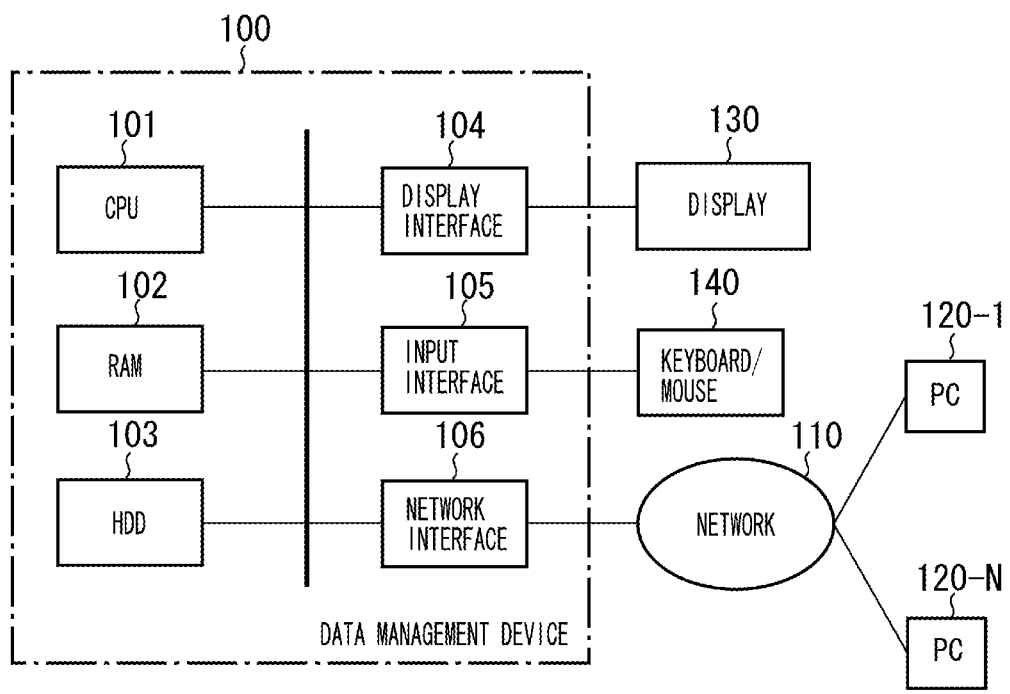
FIG. 1 is a block diagram showing a configuration of a data management system according to a first exemplary embodiment.

FIG. 1 is a block diagram showing a configuration of a data management system according to a first exemplary embodiment. As shown in FIG. 1, the data management system includes a data management device 100 and a plurality of personal computers (hereinafter, referred to as PC) 120-1 to 120-N. The data management device 100 and the PCs 120-1 to 120-N are connected through a network 110 such as the Internet. The data management device 100 is connected to a display 130 and an input device 140 such as a keyboard and a mouse.

The data management device 100 includes a CPU 101, a RAM 102, an HDD 103, a display interface 104, an input interface 105, and a network interface 106. In the exemplary embodiment, the CPU 101 controls the whole data management device 100. The CPU 101 executes arithmetic processing. The RAM 102 serves as a memory that temporarily stores data accompanying the processing executed by the CPU 101. The HDD 103 stores a large volume of data such as a control program of the CPU 101 and contents. The display interface 104 converts screen data into a signal which can be displayed on the display 130, and outputs the signal. The input interface 105 inputs a command from the keyboard and mouse 140. The network interface 106 converts communication packet data into a communication signal.

In the above-described configuration, a control program for the data management device stored in the HDD 103 is read into the RAM 102. Then, the CPU 101 executes arithmetic processing according to the control program. The CPU 101 creates screen data to display on the display 130 or converts the screen data into communication packet data to transmit to the PCs 120-1 to 120-N. Further, when the keyboard and mouse 140, or the PCs 120-1 to 120-N issue a command to display a list of contents, the input data are transmitted to the CPU through the input interface 105 or the network interface 106. Then, the CPU 101 reads contents information from the HDD 103 according to the control program running on the RAM 102 to perform display in the above-described way.

In the embodiment, it is assumed that a general web browser is run on the PCs 120-1 to 120-N. However, an exclusive client application can also be utilized. Further, the PCs 120-1 to 120-N can be a portable information terminal, a cellular telephone, or a set top box. Furthermore, the PCs 120-1 to 120-N can input and output the data without the keyboard and mouse 140 but only through the network. Alternatively, the PCs 120-1 to 120-N can input and output the data only with equipment such as the display, and the keyboard and mouse 140 without connection to the network 110.

Figure 2:
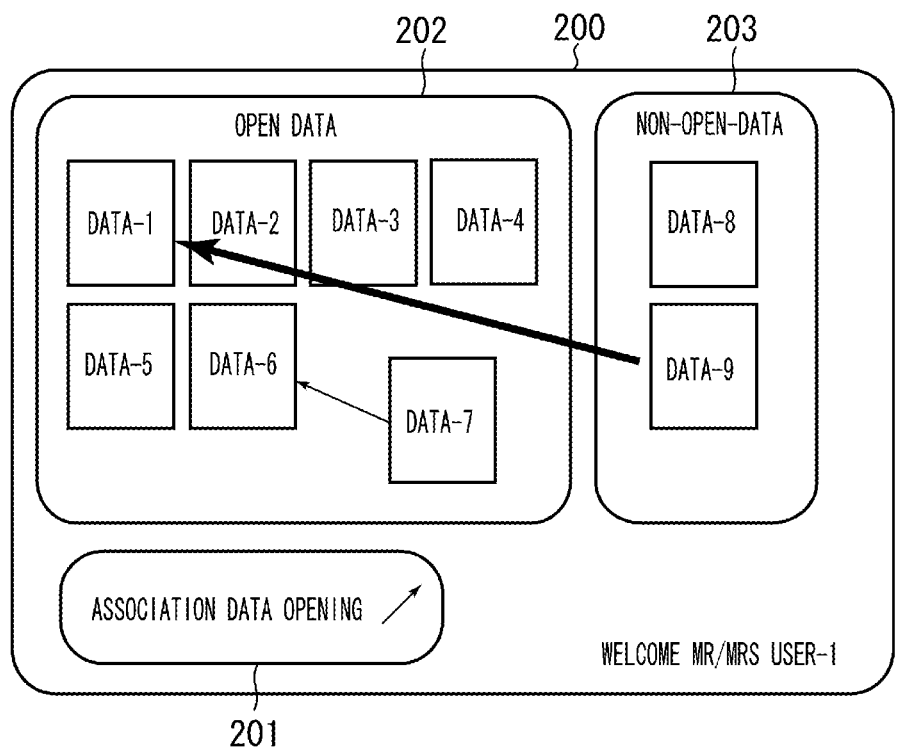
FIG. 2 is a diagram showing one example of an association setting screen of a data management system according to a first exemplary embodiment.

FIG. 2 is a diagram showing one example of an association setting screen of a data management system according to the first exemplary embodiment. As shown in FIG. 2, a setting screen 200 includes an open data area 202, a non-open data area 203, and an association data opening button 201.

In this example, data-1 to data-7 are displayed on the open data area 202, and data-8 and data-9 are displayed on the non-open data area 203. FIG. 2 shows a state in which the data-7 is opened in association with the data-6, and the data-9 is intended to be opened in association with the data-1. Here, as an example of the specific operation, first, the association data opening button 201 is clicked. Thereafter, the data-9 and data-1 are clicked. Then, a display is updated so as to connect the data-9 and data-1 by an arrow. A determination button and a cancel button (not shown) can be provided.

Figure 3:
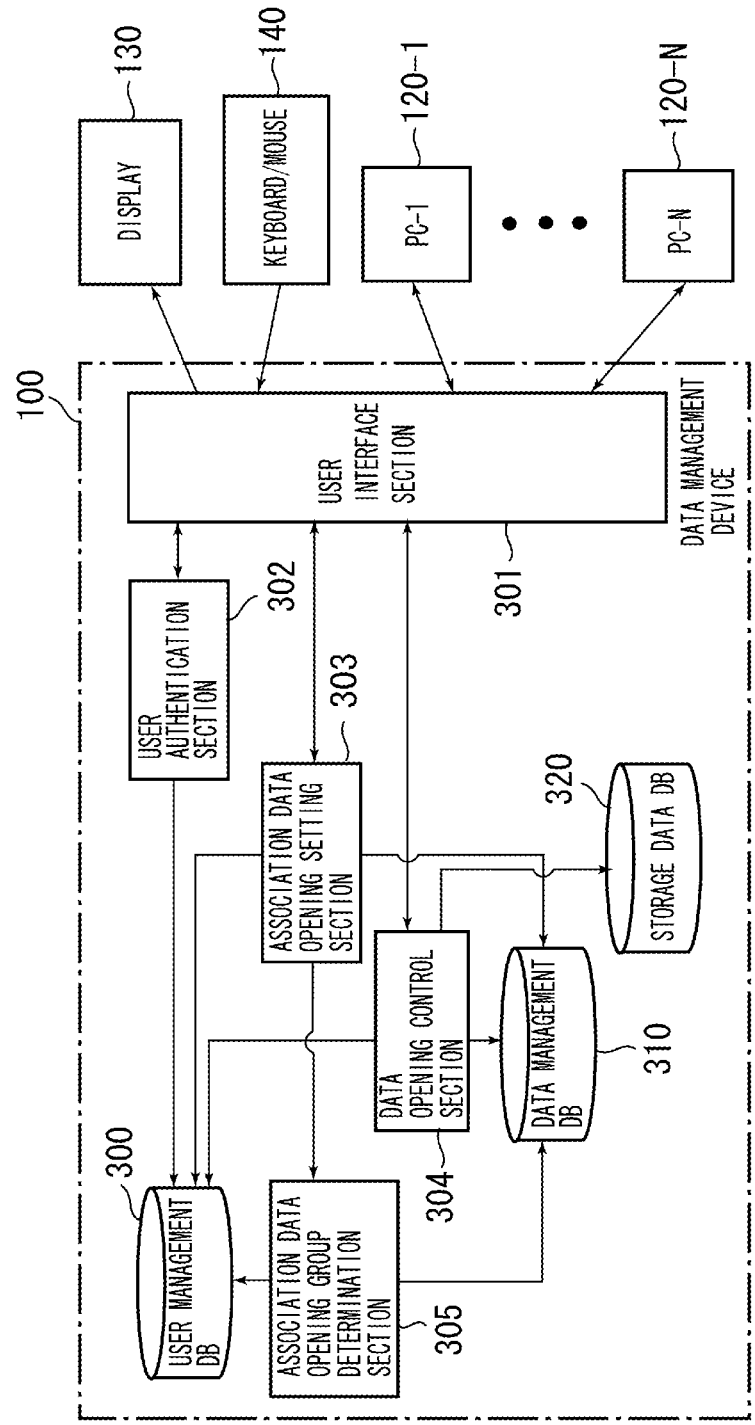
FIG. 3 is a block diagram showing a functional configuration of a data management system 100 according to a first exemplary embodiment.

FIG. 3 is a block diagram showing a functional configuration of a data management system 100 according to the first exemplary embodiment. As shown in FIG. 3, the function of the data management device 100 includes a user management DB 300, a data management DB 310, and a storage data DB 320 as a data base (DB). Further, the function of the data management device 100 includes a user interface section 301, a user authentication section 302, an association data opening setting section 303, a data opening control section 304, and an association data opening group determination section 305.

Figure 4:
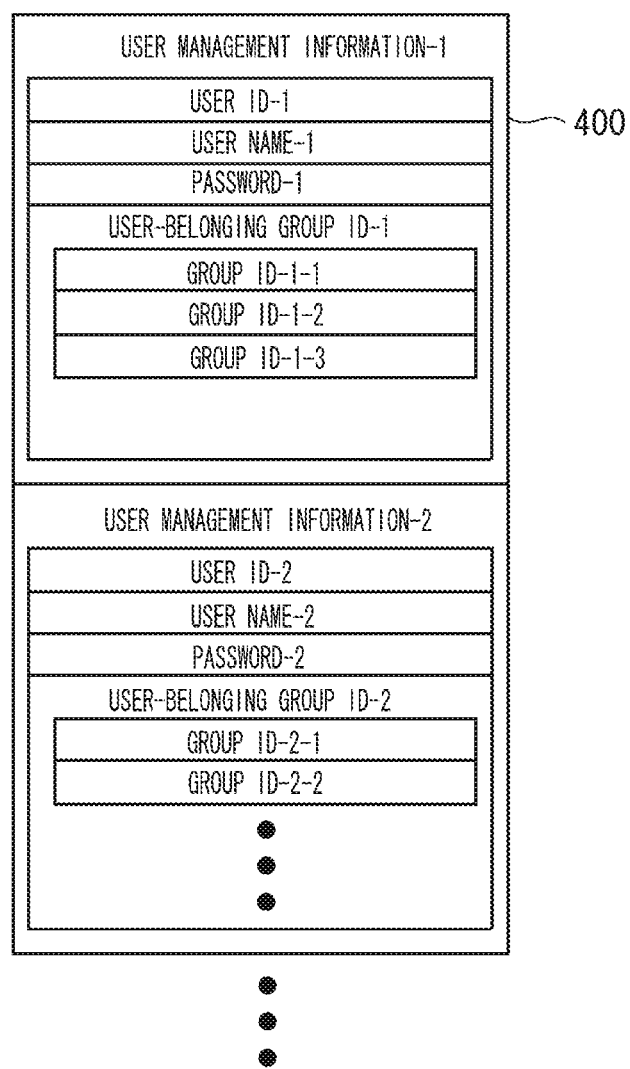
FIG. 4 is a diagram showing one example of a configuration of user management information according to a first exemplary embodiment.

In this exemplary embodiment, the user management DB 300 is the data base for storing and managing user management information shown in FIG. 4. FIG. 4 is a diagram showing one example of a configuration of the user management information according to the first exemplary embodiment. As shown in FIG. 4, user management information 400 manages a user ID, a user name, a password, and a user-belonging group ID for every user. The user ID is uniquely allocated to a user. The user-belonging group ID is uniquely allocated to a group to which the user belongs. The same as above may also apply in the following.

Figure 5:
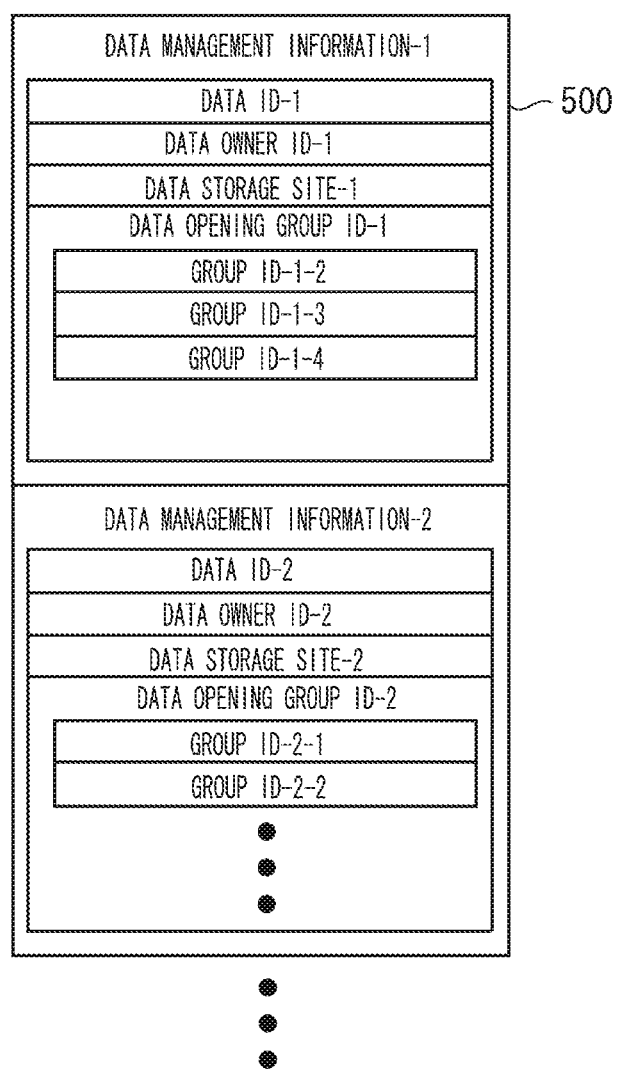
FIG. 5 is a diagram showing one example of a configuration of data management information according to a first exemplary embodiment.
Figure 6:
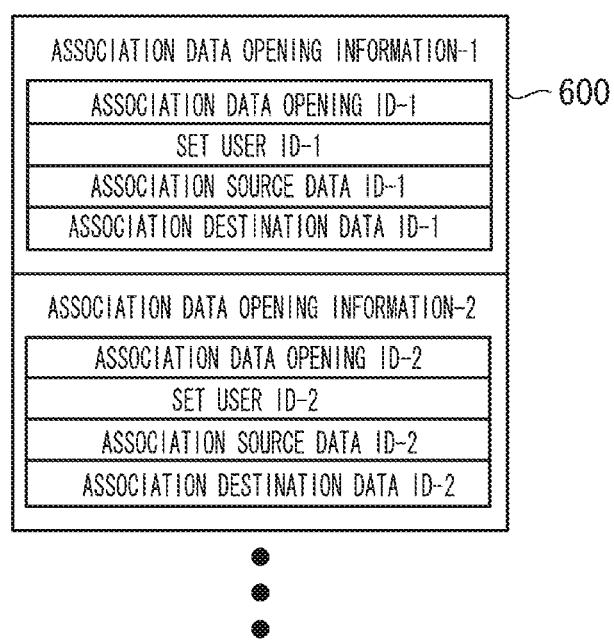
FIG. 6 is a diagram showing one example of a configuration of association data opening information according to a first exemplary embodiment.

The data management DB 310 of the data management device 100 stores and manages data management information shown in FIG. 5 and association data opening information shown in FIG. 6. FIG. 5 is a diagram showing one example of a configuration of the data management information according to the first exemplary embodiment. As shown in FIG. 5, data management information 500 manages a data ID, a data owner ID, a data storage site, and a data opening group ID for every data. The data ID is uniquely allocated to data. The data owner ID is a user ID of a user having data. The data storage site indicates a storage site of data in the storage data DB 320 that stores and manages contents. Then, the data opening group ID is an ID of a group to which these data are opened. The same as above may also apply in the following.

FIG. 6 is a diagram showing one example of a configuration of the association data opening information according to the first exemplary embodiment. As shown in FIG. 6, association data opening information 600 manages an association data opening ID, a set user ID, an association source data ID, and an association destination data ID for every association data opening information. The association data opening ID is uniquely allocated to the association data opening information. The set user ID is an ID of a user to whom association is set. Further, the association source data ID is a data ID of an association source. The association destination data ID is a data ID of an association destination.

Returning to FIG. 3, the user interface section 301 creates and outputs a user interface screen in accordance with a display device such as the display 130 and the PCs 120-1 to 120-N. Further, the user interface section 301 receives input data from an input device such as the keyboard and mouse 140 and the PCs 120-1 to 120-N to transmit the input data to each function which will be described later. The user authentication section 302 searches the user management information 400 of the user management DB 300 based on a logon screen (for example, user name, password information) created in the user interface section 301, to determine whether a user is an appropriate one. The association data opening setting section 303 updates the data management information 500 of the data management DB 310 and registers the association data opening information 600. Here, the association data opening setting section 303 registers the information in response to the determination result of the association data opening group determination section 305, from an association data opening setting screen (for example, association source data, association destination data, set user information) created in the user interface section 301.

Upon receipt of a data opening command through the user interface section 301, the data opening control section 304 searches the user management information 400 from the user management DB 300 and searches the data management information 500 from the data management DB 310. Then, the data opening control section 304 reads data to be opened from the storage data DB 320, and creates and displays a data opening screen through the user interface section 301. The association data opening group determination section 305 searches the user management information 400 from the user management DB 300. The association data opening group determination section 305 searches the data management information 500 from the data management DB 310 and determines an opening group to which the association data are opened.

Next, the start processing of the data management system, the association data opening setting processing, and the data opening processing of the data management system will be described with reference to FIGS. 7 to 9. Specifically, a case will be described in which a user-1 of the PC 120-1 opens the open data 1 in association with the non-open data 9 in the association setting screen shown in FIG. 2. The user-1 is managed in the user management DB 300 as user management information-1. The open data 1 is managed in the data management DB 310 as data management information-1.

Figure 7:
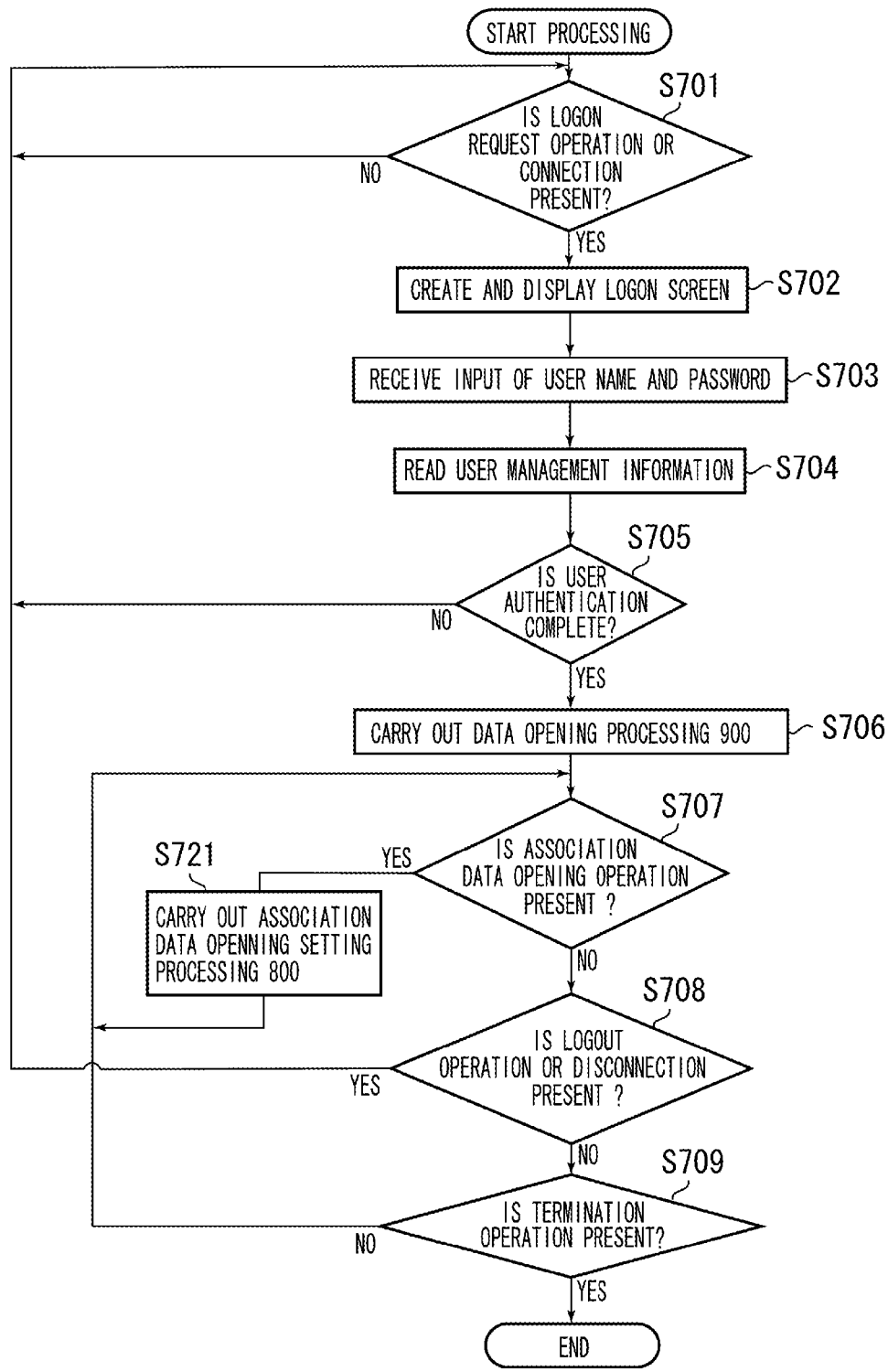
FIG. 7 is a flowchart showing start processing of a data management system according to a first exemplary embodiment.

FIG. 7 is a flowchart showing start processing of the data management system according to the first exemplary embodiment. First, in step S701, the processing waits for detection of user logon request operation or connection. When the user logon request operation or the connection is detected, the processing proceeds to step S702. In step S702, a logon screen is created and displayed. Then, in step S703, the input of a user name and a password is received. In step S704, the corresponding user management information-1 is read from the user management information 400 of the user management DB 300. Next, in step S705, when user authentication is completed in the user authentication section 302 (for example, a user is present and a password is matched), the processing proceeds to step S706. In step S706, data opening processing shown in FIG. 9 is executed. This data opening processing will further be described later.

Next, in steps S707 to S709, the processing waits for association data opening operation caused by clicking the above-described association data opening button 201, logout operation and disconnection not shown in the screen 200, and termination operation by pressing a power supply button. Here, if the association data opening operation is executed, the processing proceeds to step S721 and, the association data opening operation shown in FIG. 8 is executed. When the logout operation or the disconnection is executed, the processing returns to step S701 and the above-described processing is repeated. Alternatively, if the termination operation is executed, this processing ends. Further, in the above-described step S705, if the user authentication fails (for example, the user is not present or the password is not matched), the processing returns to step S701. Then, the above-described processing is repeated.

Figure 8:
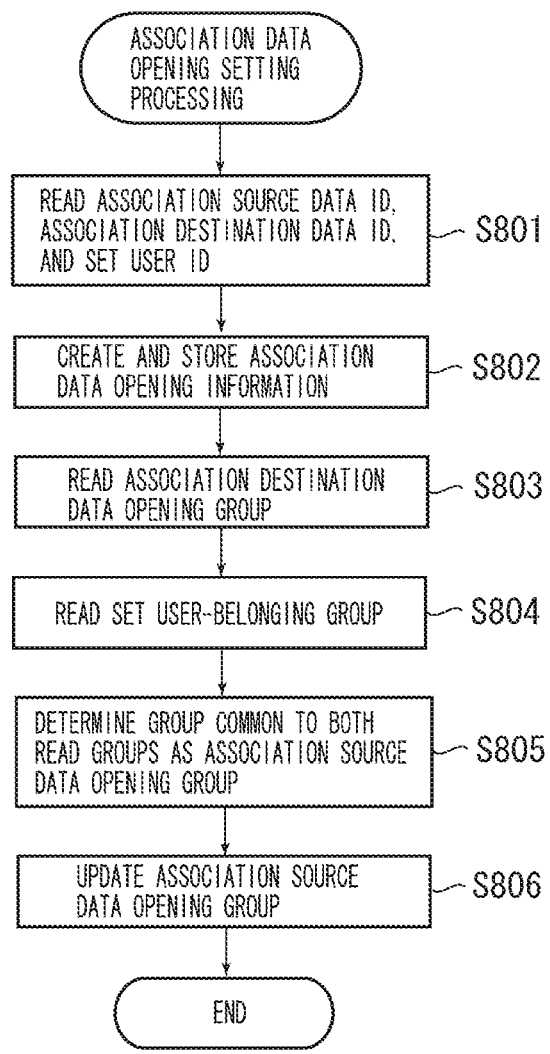
FIG. 8 is a flowchart showing association data opening setting processing according to a first exemplary embodiment.

FIG. 8 is a flowchart showing association data opening setting processing according to the first exemplary embodiment. First, in step S801, the association data opening setting section 303 reads an association source data ID, an association destination data ID, and a set user ID input in the association data opening setting screen by the user interface section 301. Next, in step S802, the association data opening setting section 303 provides the association data opening ID to store the read information in the association data opening information 600 of the data management DB 310 (for example, association data opening information-2). Then, in step S803, the association data opening setting section 303 searches the data management information 500 of the data management DB 310 based on the association destination data ID (in this case, data ID-1) to read a data opening group ID-1 from the data management information-1.

Next, in step S804, the association data opening setting section 303 searches the user management information 400 of the user management DB 300 based on a set user ID to read a user-belonging group ID-1 of a user ID-1. Then, in step S805, the association data opening setting section 303 determines a common group ID as the data opening group ID of the association source data, from the data opening group ID-1 in step S803 and the user-belonging group ID-1 in step S804. In an example shown in FIGS. 4 and 5, a group ID1-2 and a group ID1-3 correspond to the data opening group of data 9. Next, in step S806, the association data opening setting section 303 searches the data management information 500 based on the association source data ID to update a data opening group ID-9 of a data ID-9 to a group ID determined in step S805. Then, this processing ends.

By the above-described processing, non-open data-9 associated with the open data 1 is opened by the user-1. Thus, the non-open data 9 is not opened to a group ID-1 which is unrelated to the data 1, and a group ID-4 which is unrelated to the user-1.

Figure 9:
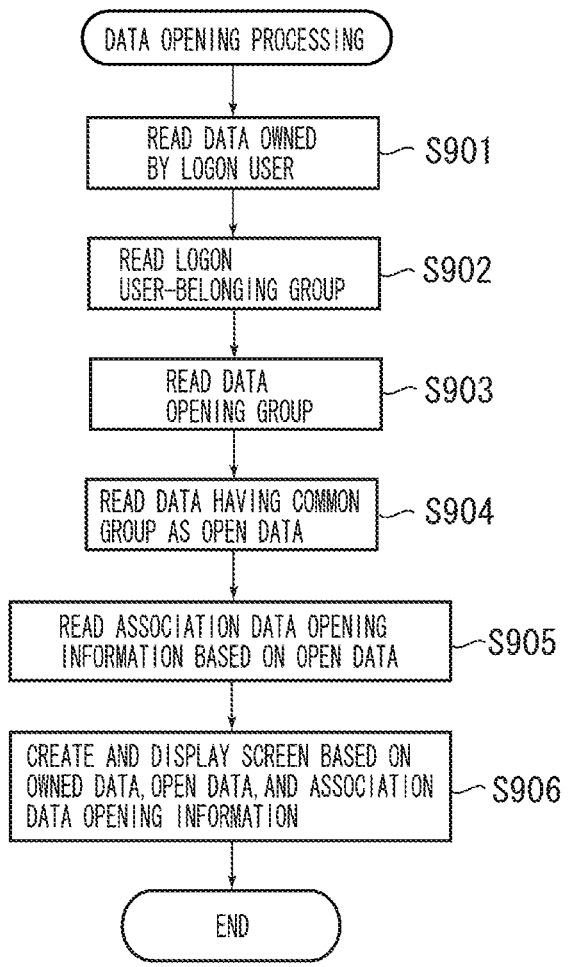
FIG. 9 is a flowchart showing data opening processing according to a first exemplary embodiment.

FIG. 9 is a flowchart showing data opening processing according to the first exemplary embodiment. This processing is executed by the data opening control section 304.

First, in step S901, the data opening control section 304 searches data in which a user is an owner, from the data management DB 310 based on a user name of a logon user to read all data of the storage data DB 320 according to the data storage site of the data management information which manages each of data. Next, in step S902, the data opening control section 304 searches the user management DB 300 based on a user name of a logon user to read the user-belonging group ID-1 from the user management information-1 in this example. Then, in step S903, the data opening control section 304 reads the data opening group ID from the data management information searched in step S901.

Next, in step S904, the data opening control section 304 reads data having a group common to the user-belonging group ID-1 in step S902 and the data opening group ID in step S903, from the storage data DB 320 as data to be opened. Then, in step S905, the data opening control section 304 reads association data opening information having a data ID of open data as an association destination data ID, from the data management DB 310 (association data opening information-2). Next, in step S906, the data opening control section 304 creates and displays a screen from owner data in step S901, open data in step S904, and association data opening information in step S905. Then, this processing ends.

According to the first exemplary embodiment, by associating certain data with another data to set opening, a group common to a group to which a set user belongs and a group to which data of an association destination are opened, is set as an opening group of data which is newly opened. Hence, opening is not set to a group to which an opening user does not belong or a group to which data of an association destination are not opened, so that data opening to a relevant group is realized by a simple operation. Further, since association setting is displayed, the data opening by association is clearly transmitted to a user.

Second Exemplary Embodiment

Next, a second exemplary embodiment will be described in detail in accordance with the drawings. A configuration of a data management system in the second exemplary embodiment is the same as that in the first exemplary embodiment described using FIG. 1. Further, an association setting screen is the same as that in FIG. 2 and user management information, data management information, association data opening information, and start processing are the same as those in FIGS. 4 to 7.

A functional configuration of the data management system in the second exemplary embodiment will be described using FIG. 10. In this exemplary embodiment, the same numerals are assigned to the functional configuration identical to the first exemplary embodiment shown in FIG. 3. Thus, the description thereof is omitted.

Figure 10:
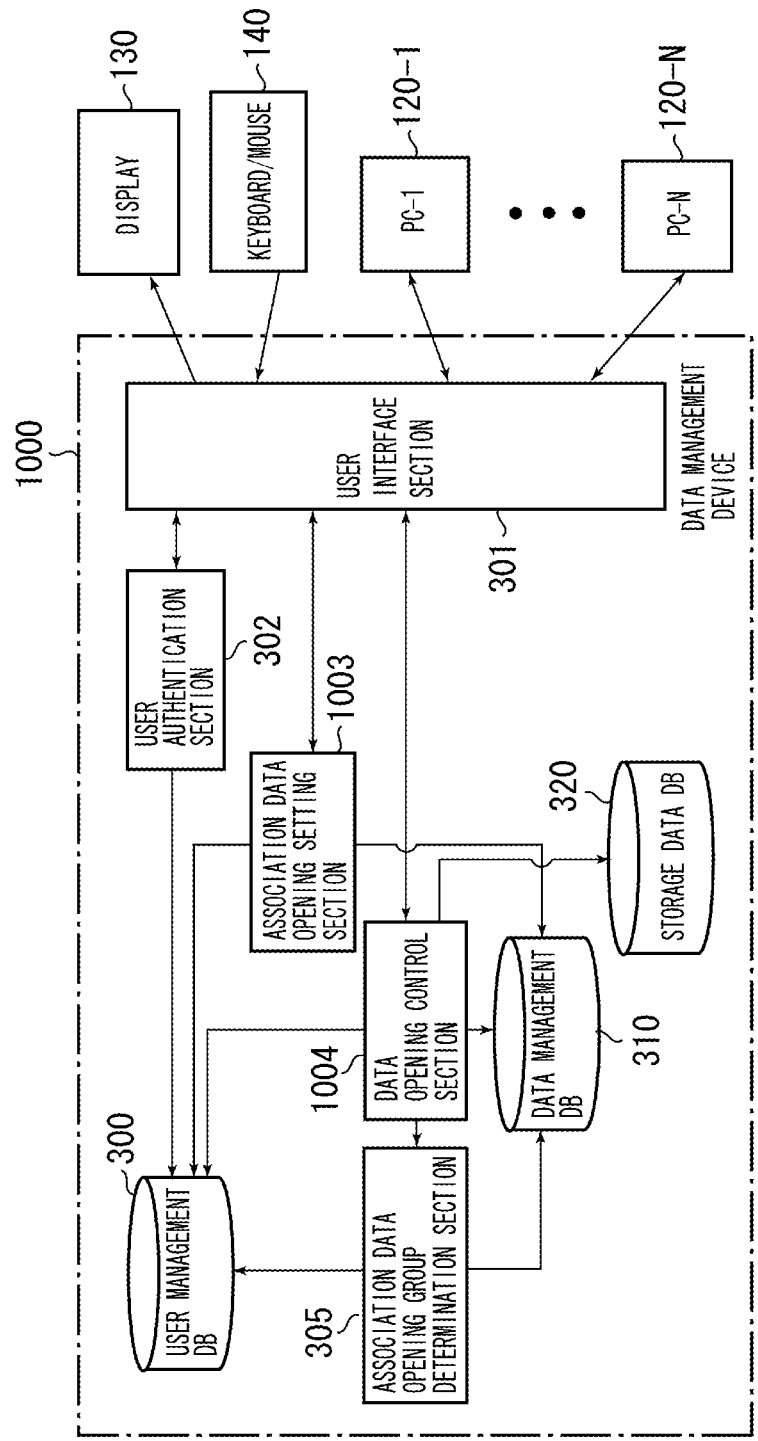
FIG. 10 is a block diagram showing a functional configuration of a data management system according to a second exemplary embodiment.

FIG. 10 is a block diagram showing the functional configuration of the data management system according to the second exemplary embodiment. An association data opening setting section 1003 registers the association data opening information 600 in the data management DB 310 based on the association data opening setting screen (association source data, association destination data, set user information) created in the user interface section 301. A data opening control section 1004 inputs a data opening command through the user interface section 301. The data opening control section 1004 searches the user management information 400 from the user management DB 300, and the association data opening information 600 from the data management DB 310. The data opening control section 1004 starts the association data opening group determination section 305. The data opening control section 1004 reads data to be opened, and data to be associated and opened, from the storage data DB 320. The data opening control section 1004 creates and displays a data opening screen through the user interface 301.

Next, association data opening setting processing and data opening processing will be described using FIGS. 11 and 12. Start processing of the data management system in the second exemplary embodiment is the same as that in the first exemplary embodiment shown in FIG. 7. Thus, the description will be omitted.

Figure 11:
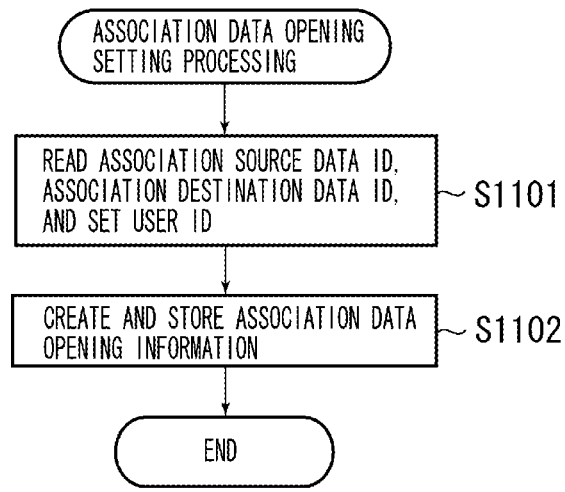
FIG. 11 is a flowchart showing association data opening setting processing of a data management system according to a second exemplary embodiment.

FIG. 11 is a flowchart showing the association data opening setting processing of the data management system according to the second exemplary embodiment. First, in step S1101, the association data opening setting section 1003 reads an association source data ID, an association destination data ID, and a set user ID input in the association data opening setting screen by the user interface section 301. Next, in step S1102, the association data setting section 1003 provides an association data opening ID. The association data setting section 1003 stores read information in the association data opening information 600 of the data management DB 310 (for example, association data opening information-2 shown in FIG. 6). Then, this processing ends.

Figure 12:
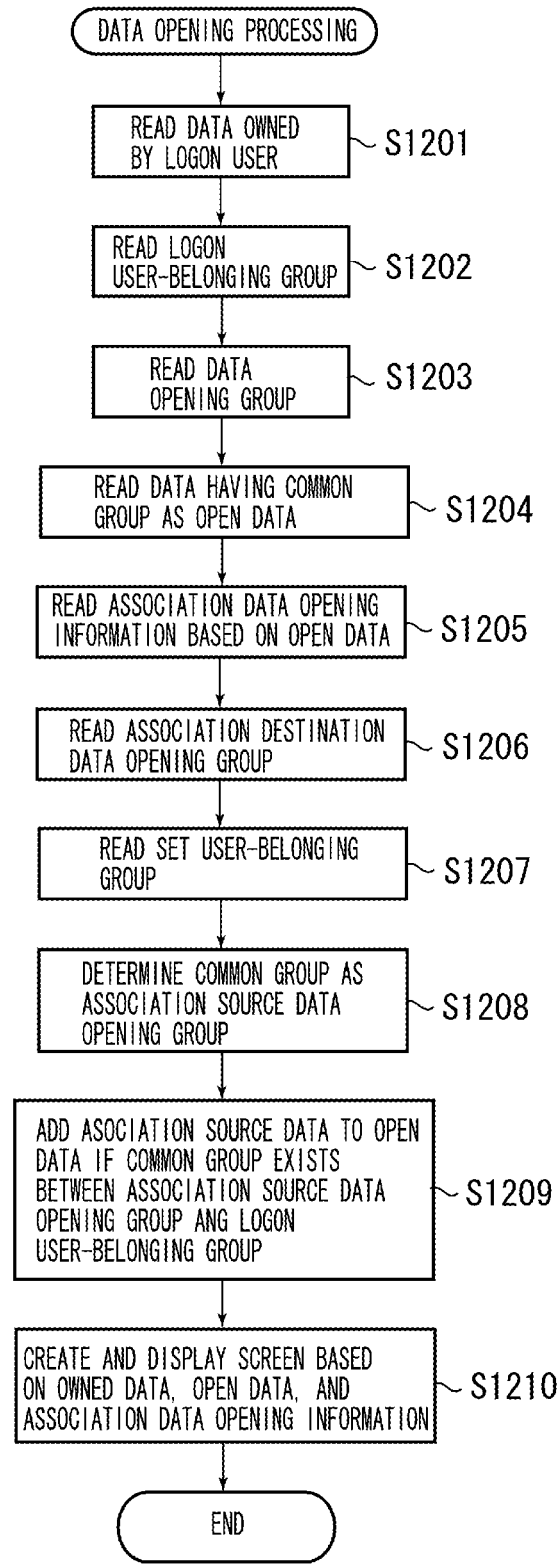
FIG. 12 is a flowchart showing data opening processing according to a second exemplary embodiment.

FIG. 12 is a flowchart showing data opening processing according to the second exemplary embodiment. First, in step S1201, the data opening control section 1004 reads all data in which a logon user is an owner as in the first exemplary embodiment. Next, in step S1202, the data opening control section 1004 searches the user management DB 300 based on a user name of the logon user. In this example, the user-belonging group ID-1 is read from the user management information-1. Then, in step S1203, the data opening control section 1004 reads a data opening group ID from the data management information searched in step S1201.

Next, in step S1204, the data opening control section 1004 reads data having a group common to the user-belonging group ID-1 in step S1202 and the data opening group ID in step S1203, as data to be opened. Then, in step S1205, the data opening control section 1004 reads the association data opening information having a data ID of open data as the association destination data ID from the data management DB 310 (association data opening information-2). Next, in step S1206, the data opening control section 1004 searches the data management information 500 of the data management DB 310 based on the association destination data ID (in this case, data ID-1) and reads the data opening group ID-1 from the data management information-1.

Next, in step S1207, the data opening control section 1004 searches the user management information 400 of the user management DB 300 based on a set user ID and reads the user-belonging group ID-1 of the user ID-1. Then, in step S1208, the data opening control section 1004 determines a group ID common to the data opening group ID-1 in step S1206 and the user-belonging group ID-1 in step S1207, as the data opening group ID of the association source data. Next, in step S209, the data opening control section 1004 reads the association source data from the storage data DB 320 in which a group ID common to the data opening group of the association source data and the user-belonging group ID of a logon user are present, and adds the association source data to open data. Then, in step S1210, as in the first exemplary embodiment, the data opening control section 1004 creates a screen from owner data, open data, and association data opening information and displays them. Then, this processing ends.

In the second exemplary embodiment, since certain data is associated with another data to set opening, a group common to a group to which a set user belongs and a group to which data of an association destination are opened, is set as an opening group of newly opened data. Hence, opening is not set to a group to which an opening user does not belong and a group to which data of an association destination are not opened so that data opening to a relevant group is realized by a simple operation.

Further, in the second exemplary embodiment, since the determination of the association data opening group is carried out at the time the data are opened. Thus, even if the user-belonging group or the data opening group is changed, it is not necessary to update the association data opening group. Further, in the second exemplary embodiment, since association setting is displayed, the opening of data by association is clearly transmitted to a user.

Third Exemplary Embodiment

Next, a third exemplary embodiment will be described in accordance with the drawings. The configuration of a data management system and a data management device in the third exemplary embodiment is the same as those in the first exemplary embodiment described using FIGS. 1 and 3. Further, user management information, data management information, association data opening information, and start processing are similar to FIGS. 4 to 7.

Figure 13:
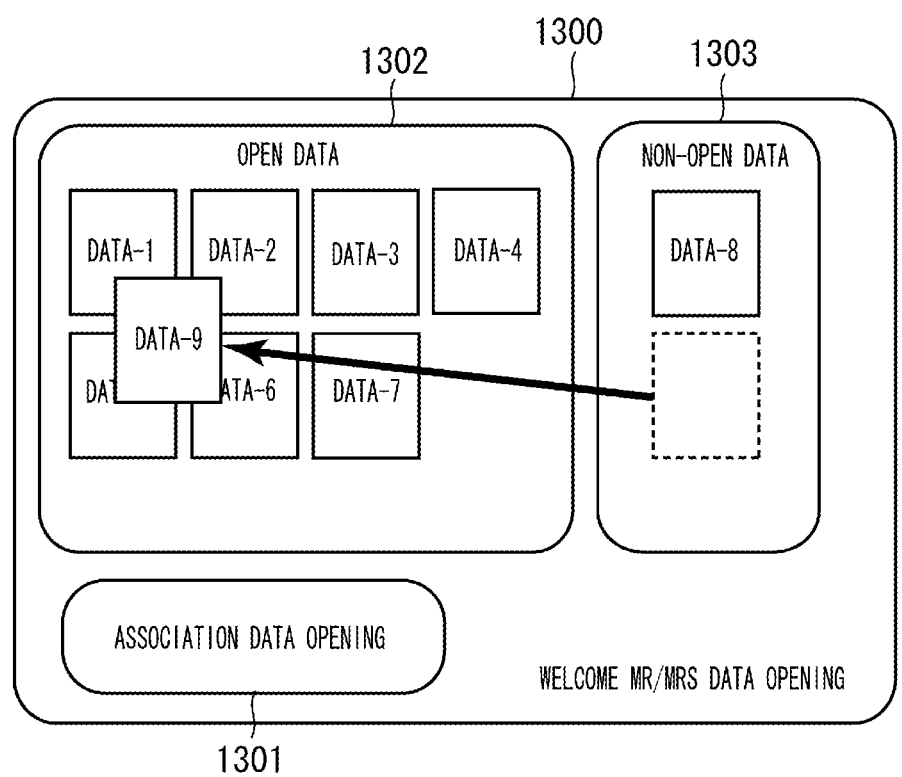
FIG. 13 is a diagram showing one example of an association setting screen of a data management system according to a third exemplary embodiment.

FIG. 13 is a diagram showing one example of an association setting screen of the data management system according to the third exemplary embodiment. As shown in FIG. 13, a setting screen 1300 includes an open data area 1302, a non-open data area 1303, and an association data opening button 1301. In this example, data-1 to data-7 are open data, and data-8 and data-9 are non-open data. FIG. 13 shows a state in which the data-9 is to be associated with data-1 and opened. For a specific example of an operation for association, the association data opening button 201 is clicked and after that, the data-9 is dragged to data-1 by a mouse. A determination button and a cancel button (not shown in this exemplary embodiment) can be provided.

Figure 14:
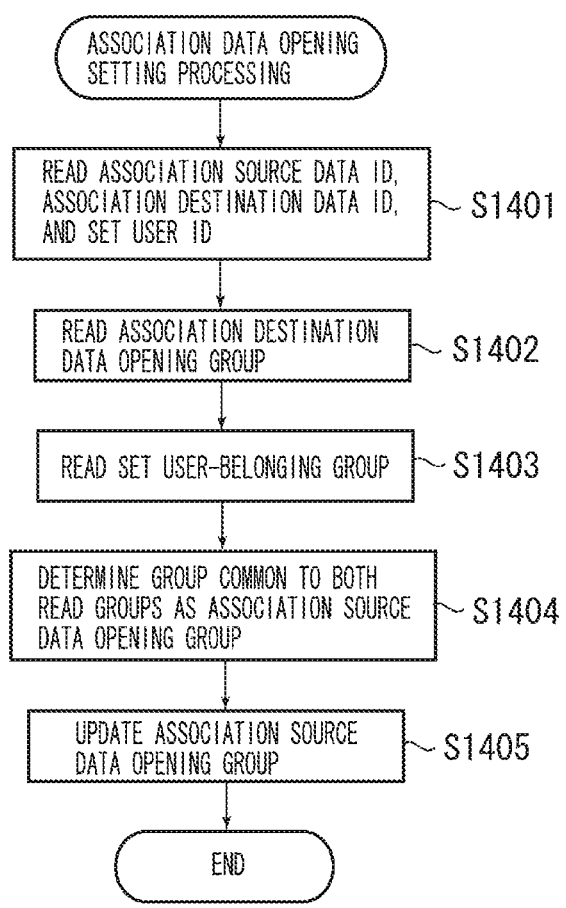
FIG. 14 is a flowchart showing association data opening setting processing of a data management system according to a third exemplary embodiment.

FIG. 14 is a flowchart showing the association data opening setting processing of the data management system according to the third exemplary embodiment. This processing is executed by the association data opening setting section 303 and the association data opening group determination section 305.

First, in step S1401, the association data opening setting section 303 reads an association source data ID, an association destination data ID, and a set user ID input in the association data opening setting screen by the user interface section 301. Next, in step S1402, the association data opening setting section 303 reads a data opening group ID of association destination data, from the data management DB 310 based on an association destination data ID. In this exemplary embodiment, as in the first exemplary embodiment, the association data opening setting section 303 reads the data opening group ID-1 from the data management information-1.

Next, in step S1403, the association data opening group determination section 305 searches the user management information 400 of the user management DB 300 based on a set user ID and reads the user-belonging group ID-1 of the user ID-1. Then, in step 1404, the association data opening group determination section 305 determines a common group ID as the data opening group ID of the association source data from the data opening group ID-1 in step S1402 and the user-belonging group ID-I in step S1403. Next, in step S1405, as in the first exemplary embodiment, the association data opening group determination section 305 updates the data opening group ID-9 of the association source data ID (in this case, corresponding to data 9) to the group ID determined in step S1404. Then, this processing ends.

Figure 15:
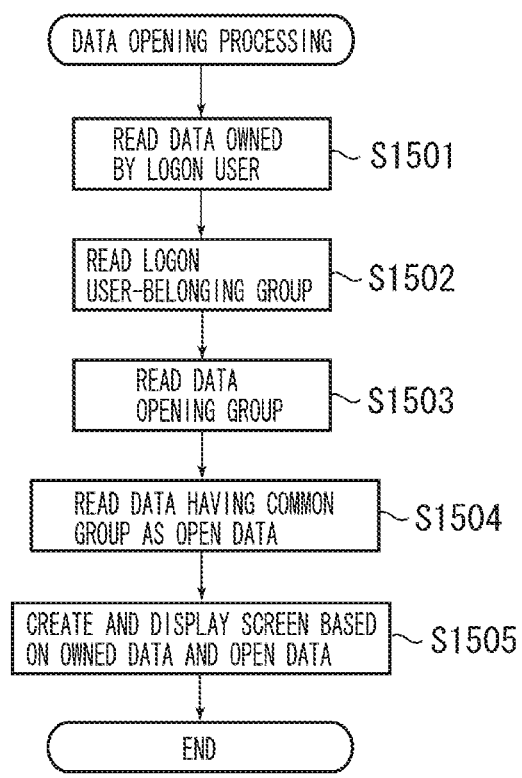
FIG. 15 is a flowchart showing data opening processing of a data management system according to a third exemplary embodiment.

FIG. 15 is a flowchart showing the data opening processing of the data management system according to the third exemplary embodiment. First, in step S1501, the data opening control section 304 searches data in which a user is an owner, from the data management DB 310 based on a user name of a logon user and reads all data of the storage data DB 320 according to the data storage site of data management information in which each data is managed. Next, in step S1502, the data opening control section 304 searches the user management DB 300 based on a user name of a logon user. In this example, the data opening control section 304 reads the user-belonging group ID-1 from the user management information-1. Then, in step S1503, the data opening control section 304 reads the data opening group ID from the data management information searched in step S1501.

Next, in step S1504, the data opening control section 304 reads data having a group common to the user-belonging group ID-1 in step S1502 and the data opening group ID in step S1503, as data to be opened, from the storage data DB 320. Then, in step S1505, the data opening control section 304 creates and displays a screen from owner data and open data. Then, this processing ends.

In the third exemplary embodiment, by associating certain data with another data to set opening, a group common to a group to which a set user belongs and a group to which data of an association destination are opened, is set as an opening group of newly opened data. Hence, opening is not set to a group to which an opening user does not belong or a group to which data of an association destination are not opened so that data opening to a relevant group is realized by a simple operation Further, in the third exemplary embodiment, the opening setting of the association data can be carried out with a more intuitive operation.

Fourth Exemplary Embodiment

Next, a fourth exemplary embodiment will be described in detail in accordance with the drawings. The configuration of a data management system and a data management device in the fourth exemplary embodiment is the same as those in the first exemplary embodiment described using FIGS. 1 and 3. Further user management information, data management information, start processing, and data opening processing are similar to FIGS. 4, 5, 7 and 9.

Figure 16:
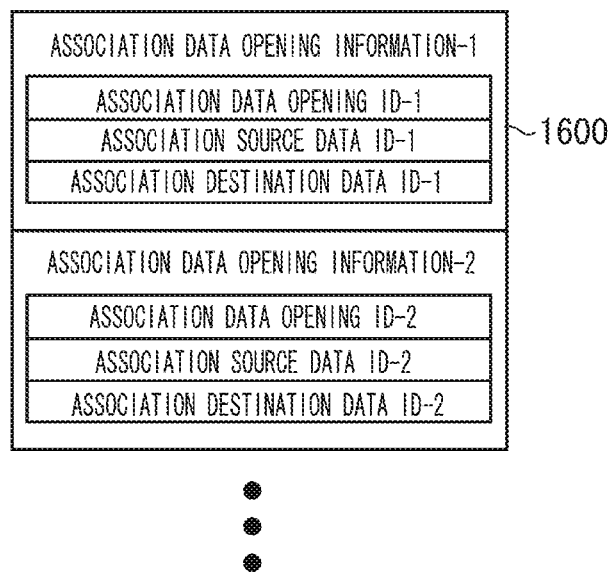
FIG. 16 is a diagram showing one example of a configuration of association data opening information according to a fourth exemplary embodiment.

FIG. 16 is a diagram showing one example of a configuration of association data opening information according to the fourth exemplary embodiment. As shown in FIG. 16, association data opening information 1600 includes an association data opening ID, an association source data ID, and an association destination data ID. In this exemplary embodiment, the association data opening ID is uniquely allocated to the association data opening information. The same as above may also apply in the following. Further, the association source data ID is a data ID of an association source. The association destination data ID is a data ID of an association destination.

Figure 17:
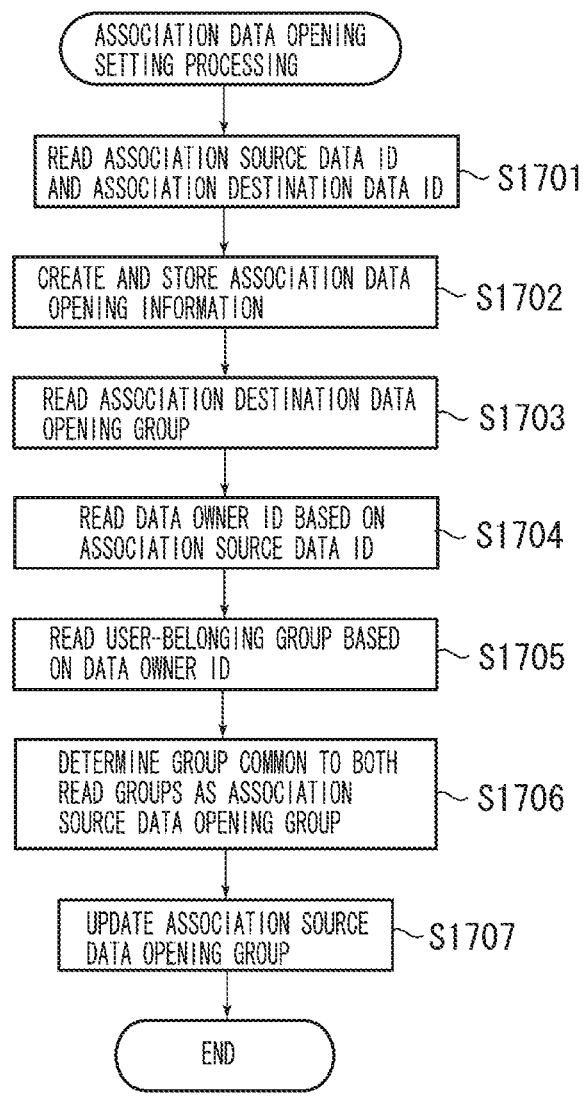
FIG. 17 is a flowchart showing association data opening setting processing according to a fourth exemplary embodiment.

FIG. 17 is a flowchart showing association data opening setting processing according to the fourth exemplary embodiment. First, in step S1701, the association data opening setting section 303 reads an association source data ID, and an association destination data ID input in the association data opening setting screen by the user interface section 301. Next, in step S1702, the association data opening setting section 303 provides an association data opening ID and stores read information in the association data opening information 1600 of the data management DB 310 (for example, association data opening information-2 shown in FIG. 16). Then, in step S1703, the association data opening setting section 303 searches the data management information 500 of the data management DB 310 based on the association destination data ID (in this case, data-ID-1) and reads the data opening group ID-1 from the data management information-1.

Next, in step S1704, the association data opening setting section 303 reads a data owner ID from the data management DB 310 based on the association source data ID. Next, in step S1705, the association data opening group determination section 305 reads a user-belonging group ID from the user management DB 300 based on a data owner ID. Then, in step S1706, the association data opening setting section 303 determines a group ID common in a read data opening group ID and a user-belonging group ID as a data opening group ID of association source data. In step S1707, then, the association data opening setting section 303 updates the data opening group ID of the data management information 500 of the association source data. Then, the processing ends.

In step S901 of data opening processing, only data that a logon user is an owner, are read and displayed on the non-open data display area 203 of the association setting screen 200. Hence, a user who can set association is limited to an owner of data.

In the fourth exemplary embodiment, by associating certain data with another data to set opening, a group common to a group to which a set user belongs and a group to which data of an association destination are opened, is set as an opening group of data to be newly opened. Hence, opening is not set to a group to which an opening user does not belong and a group to which data of an association destination are not opened so that data opening to a relevant group is realized by a simple operation. Further, it is not necessary to hold a set user ID in the association data opening information, thus the usage of a resource can be reduced.

Further, in the fourth exemplary embodiment, since association setting is displayed, the opening of data by association is clearly transmitted to a user.

Note that the present invention can also be applied to a system including a plurality of instruments (for example, host computer, interface equipment, reader, printer or the like), or an apparatus including one instrument (for example, copying machine, facsimile machine or the like).

Further, a system or an apparatus is supplied with a recording medium that records a program code of software which realizes the function of the above-described exemplary embodiment. A computer (CPU or MPU) of the system or the apparatus reads and executes the program code stored in the recording medium. The present invention can also be implemented in this way.

In this case, the program code itself read from the recording medium realizes the function of the above-described exemplary embodiment. Thus, the recording medium storing the program code constitutes the present invention.

The recording medium for providing this program code includes, for example, a floppy disk, a hard disk, an optical disk, a magneto-optical disk, a CD-ROM, a CD-R, a magnetic tape, a non-volatile memory card, and a ROM.

Further, not only by executing the program code read by a computer, the above-described function is realized, but also an operating system (OS) or the like running on the computer can execute a part or all of actual processing based on the command of the program code, thereby realizing the function of the above-described exemplary embodiment.

Further, the present invention also includes the case in which the program code read out from the recording medium is written in a memory provided in a functional extension board inserted into the computer or a functional extension unit connected to the computer, then a CPU or the like provided in the functional extension board or the functional extension unit executes a part or all of actual processing based on the command of the program code, thereby realizing the function of the above-described exemplary embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-353987 filed Dec. 7, 2005, which is hereby incorporated by reference herein in its entirety.

What is claimed is:

1. A data management device storing data, managing a plurality of users as a group and opening the data to a user who belongs to a designated group, the data management device comprising:

an association setting unit configured to set association between first data which is previously set to be opened by a first user and at least one of second data;

a determination unit configured to determine, from a plurality of first groups to which the first data is set to be opened, at least one group in common with one or more groups to which the first user setting association belongs; and an opening unit configured to open the second data to a second user belonging to the at least one group in common determined by the determination unit, after the association setting is performed by the setting unit, wherein the association setting unit is configured to set the at least one group in common determined by the determination unit as a group to which the second data is set to be opened, such that the second user belonging to the at least one group in common is allowed to open the second data, and wherein determination of the at least one group in common by the determination unit, and setting of the at least one group in common by the association setting unit as the group to which the second data is set to be opened, is performed upon opening of the first data by the first user, such that updating of the at least one group in common between openings of the first data by the user is avoided.

2. The data management device according to claims 1, wherein the association setting unit allows a user having the second data to set the association, and wherein the determination unit determines the group to which the user having the second data belongs.

3. The data management device according to claim 1, further comprising:

an association hold unit configured to hold the association setting, wherein the opening unit opens the association setting with the first data as well as the second data.

4. A data management system comprising:

a management device storing data, managing a plurality of users as a group and opening the data to a user who belongs to a designated group;

a plurality of information processing devices coupled to the data management device through a network; and an association setting unit configured to set association between first data which is previously set to be opened by a first user and at least one of second data;

wherein the management device includes a determination unit configured to determine, from a plurality of first groups to which the first data is set to be opened, at least one group in common with one or more groups to which the first user belongs, wherein the information processing device includes an opening unit configure to open the second data to a second user belonging to the at least one group in common determined by the determination unit, after the association setting is performed by the setting unit, and wherein the association setting unit is configured to set the at least one group in common determined by the determination unit as a group to which the second data is set to be opened, such that the second user belonging to the at least one group in common is allowed to open the second data, and wherein determination of the at least one group in common by the determination unit, and setting of the at least one group in common by the association setting unit as the group to which the second data is set to be opened, is performed upon opening of the first data by the first user, such that updating of the at least one group in common between openings of the first data by the user is avoided.

5. A method for managing data performed by a data management device storing data, managing a plurality of users as a group and opening the data to a user who belongs to a designated group, the method comprising:

setting association between first data which is previously set to be opened by a first user and at least one of second data;

determining, from a plurality of first groups to which the first data is set to be opened, at least one group in common with one or more groups to which the first user belongs; and opening the second data to a second user belonging to the at least one group determined to be in common, after the association between the first data and the at least one of second data is set, wherein the at least one group determined to be in common is set as a group to which the second data is set to be opened, such that the second user belonging to the at least one group in common is allowed to open the second data, and wherein determination of the at least one group in common as the group to which the second data is set to be opened, is performed upon opening of the first data by the first user, such that updating of the at least one group in common between openings of the first data by the user is avoided.

6. The method according to claim 5, wherein the setting allows a user having the second data to set the association, and wherein the determining comprises determining the group to which the user having the second data belongs.

7. The method according to claim 5, further comprising:
holding the association setting, wherein the opening comprises opening the association setting with the first data as well as the second data.

8. A computer-readable recording medium storing instructions for causing the computer to perform the method according to claim 5.

* * * * *